Figure 1:
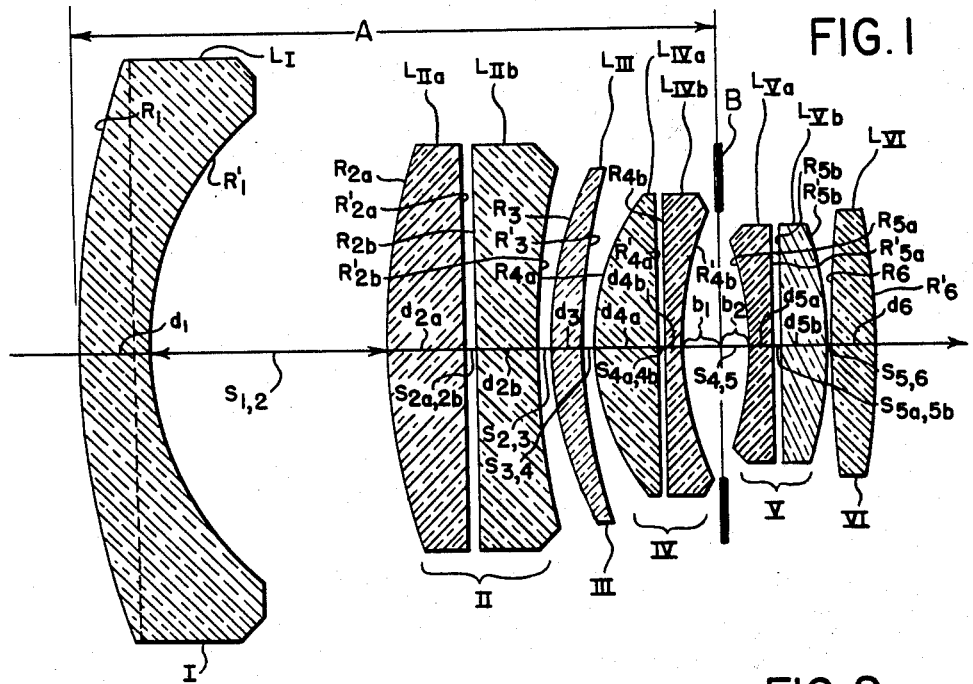

Oct. 11, 1960   A. W. TRONNIER   2,955,513
PHOTOGRAPHIC OBJECTIVE LENS OF HIGH SPEED
WITH WIDE FIELD OF VIEW
Filed April 17, 1958

INVENTOR
Albrecht Wilhelm Tronnier
BY
ATTORNEYS

United States Patent Office 2,955,513
Patented Oct. 11, 1960

2,955,513

PHOTOGRAPHIC OBJECTIVE LENS OF HIGH SPEED WITH WIDE FIELD OF VIEW

Albrecht Wilhelm Tronnier, New York, N.Y., assignor to Farrand Optical Co., Inc., New York, N.Y., a corporation of New York Filed Apr. 17, 1958, Ser. No. 728,960

9 Claims. (Cl. 88—57)

The present invention relates to high speed photographic objectives whose relative aperture lies between approximately 1:1.7 and 1:2.4 and whose useful field angle ($2\omega_0$) amounts to from 56° to 66°.

Attempts have already been made to produce photographic objectives having both high speed and wide field of view. In these proposed constructions, however, either the field was flattened over an insufficient angle, or they were required to be used with supplementary field lenses (the field flattening lenses of Smith) in order to achieve an anastigmatically flattened field. In applicant's copending application Serial No. 729,144, filed Apr. 17, 1958, applicant has disclosed the construction of objectives which, without recourse to supplemental field flattening lenses, possess an anastigmatically flattened field together with high relative aperture for a wide field of view.

The objectives of applicant's copending application above referred to achieve a substantial improvement over the art prior thereto in that they are capable of imaging sharply a wide angle field of view even at maximum aperture and hence with the large ray bundle cross-sections which are a concomitant of their high relative aperture. The present invention provides an improvement on the objectives in the copending application above referred to in that, in addition to a further improvement in imaging properties within the wide field of view, they achieve relatively long intersection distances or back focal lengths on the image side of the system between the objective and the image plane. Whereas the objectives of the copending application above referred to possess on the image side intersection distances of less than 75% of the equivalent focal length of the system, those of the present invention possess such intersection distances exceeding 80% of the equivalent focal length.

Accordingly the objectives of the present invention may be successfully used in mirror reflex type cameras. The increase in intersection distances achieved facilitates the provision of the necessary clearance between the rear element of the objective and the movable mirror mechanism. The increase in intersection distances achieved by the present invention is not obtained at the cost of a diminished lens performance such as customarily results from a decrease in the ratio of focal length to intersection distance. Hitherto, increases have been achieved in rear intersection distances in so-called normal objectives having a convergent rear assembly behind the diaphragm position, and conversely reduction has been achieved in the intersection distances of telephoto objectives with divergent rear assemblies, by increasing the refractive powers of certain elements of such lenses. This has either increased the zonal errors or has reduced the useful field angle or the relative aperture.

According to the present invention instead there is provided an objective lens system including a front assembly having its most sharply divergent surface adjacent the diaphragm position and a rear assembly of Gaussian type including at least two elements. The first component in the front assembly is of negative power, possesses surfaces of unequal curvatures, and is advantageously of meniscus shape. It is spaced at a distance from the diaphragm position lying between 0.8 and 1.8 times the equivalent focal length of the system. This first component is moreover disposed with a strongly divergent concave surface directed toward the diaphragm. The vertex of the rear surface of the first component is spaced from the second component by a distance of from one-third to two-thirds of the equivalent focal length of the system. The second component takes the form of a doublet having unequal exterior surface curvatures. The elements of this doublet are of opposite power sign but possess together a positive total power. Behind the second component there is disposed a meniscus-shaped convergent third component having its concave surface presented to the diaphragm. The front assembly is completed by means of a doublet of negative power and meniscus shape adjacent the diaphragm position, the concave exterior surface of this fourth component being turned toward the diaphragm. The convergent third component is so enclosed by the second and fourth components that the air spaces between the second and third and between the third and fourth components possess the shape of negative lenses having their more strongly curved concave surfaces presented to the diaphragm. Consequently both of these air spaces act as positive air lenses.

Figure 2:
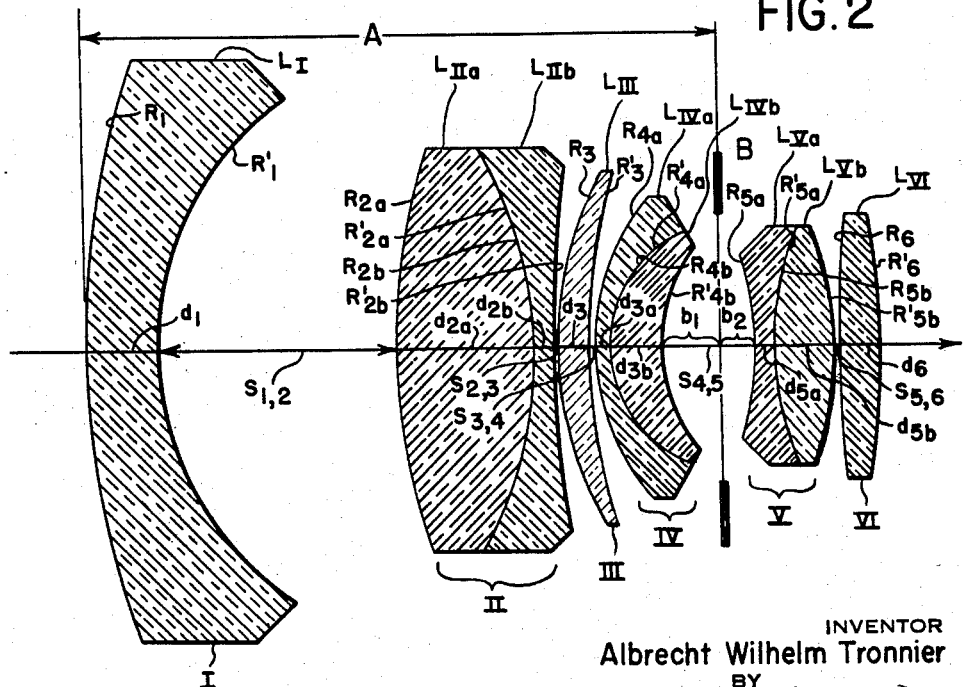

The invention will now be described by reference to the accompanying drawings in which Figs. 1 and 2 are axial sections through two lenses according to the invention.

Referring to Figs. 1 and 2, the lens of the invention includes six components I to VI, numbered from the long toward the short conjugate end of the system. Components I to IV make up the front assembly, and components V and VI make up the rear assembly. Component II includes front and rear elements $L_{IIa}$ and $L_{IIb}$, component IV includes front and rear elements $L_{IVa}$ and $L_{IVb}$, and component V includes front and rear elements $L_{Va}$ and $L_{Vb}$. The other components I, III and VI include respectively one element $L_I$, $L_{III}$ and $L_{VI}$ each. In the embodiments illustrated therefore the lens of the invention includes nine elements.

The radii of curvature of the front surfaces of the elements are identified by the letter R with arabic subscripts corresponding to the Roman identification of those elements above discussed, and the radii of curvature of the rear surfaces of the elements are identified by the symbol R' with similar subscripts. The axial thicknesses of the components are identified by the letter $d$ with subscripts which identify the elements respectively, and the axial spacings of the elements are identified by the letter $s$ with double surscripts identifying the elements preceding and following such spacings. The diaphragm position is indicated by division of the spacing $s_{4,5}$ into portions $b_1$ and $b_2$ preceding and following the diaphragm.

According to the present invention the disadvantages of the prior art lenses above adverted to are obviated by providing on the long conjugate side of the system, in front of the diaphragm position, a front assembly or combination of components having its most strongly divergent concave surface presented to the diaphragm space whereas the plural element rear assembly behind the diaphragm position is of Gaussian type. The first component I in the front assembly is of negative power, is provided with unequal surface curvatures, and is advantageously of meniscus shape. It is spaced at a distance A from the diaphragm position lying between 0.8 and 1.8 times the equivalent focal length $f$ of the system. The component I is disposed with a strongly divergent concave rear surface directed toward the diaphragm. The vertex of this rear surface of element I is spaced from the next component II by a distance $s_{1,2}$ of from one-third to two-thirds of the equivalent focal length $f$. Component II forms a doublet having unequal exterior surface curvatures. The elements $L_{IIa}$ and $L_{IIb}$ of this doublet are of opposite power sign but possess together a positive total power. Behind component II there is disposed a meniscus-shaped convergent component III having its concave surface presented to the diaphragm. The front assembly is completed by means of a doublet IV of negative power and meniscus shape adjacent the diaphragm position, the concave rear exterior surface of component IV being turned toward the diaphragm. The convergent meniscus component III is so enclosed by the components II and IV that the air spaces between components II and III and between components III and IV possess the shape of negative lenses having their more strongly curved concave surfaces presented to the diaphragm. Consequently both of these air spaces act as positive air lenses.

The front assembly of the system is accordingly characterized by a succession of components of alternating power signs as follows:

A negative component of unequal surface curvatures (I), a positive doublet (II), a positive meniscus (III), a negative doublet (IV). With abbreviations U, D and M referring respectively to components of unequal surface curvatures, to doublets and to meniscus-shaped lenses, the general plan of the lens may be symbolically written as follows:

—U; +D; +M; —D; diaphragm; Gaussian rear assembly

If, as in the preferred construction, the front component I is of meniscus shape this symbolical notation takes on the following form:

—M; +D; +M; —D; diaphragm; Gaussian rear assembly

According to a further feature of the invention the lenses thereof are characterized by a distribution of powers among the components I to IV thereof as set forth in the following table, in which $\Phi$ represents the equivalent power of the complete objective and $\phi_I$, $\phi_{II}$, $\phi_{III}$, $\phi_{IV}$ refer respectively to the sums of the powers of the exterior surfaces of the components I, II, III and IV:

$$0.35\Phi < -\phi_I < 0.75\Phi$$
$$0.35\Phi < \phi_{II} < 0.75\Phi$$
$$0.30\Phi < \phi_{III} < 0.60\Phi$$
$$0.35\Phi < -\phi_{IV} < 0.75\Phi$$

As previously stated, this power distribution is employed in conjunction with a spacing of the component I from the diaphragm position amounting of from 0.8 to 1.8 times the equivalent focal length $f$ and in conjunction with a spacing of the components I and II of from one-third to two-thirds of the equivalent focal length $f$.

For the components V and VI of the rear assembly power distributions can be employed of the type usual in Gaussian systems, within the following limits:

$$0.025\Phi < -\phi_V < 0.625\Phi$$
$$0.4\Phi < \phi_{VI} < 1.2\Phi$$

The alternating succession of power signs of the components exemplified in the succession of a negative meniscus (I), a positive doublet (II) and the succession positive meniscus (III) and negative doublet (IV), and the provision of two doublets in the front assembly make possible the distribution of powers thus set forth.

From the data on power distribution which has been given it is apparent that the objectives of the invention are characterized by extremely low powers for the individual components thereof. This makes possible in a strikingly simplified manner the achievement over a wide field of an image with low zonal errors even with the very large cross-sections which characterize the axial and extra-axial ray bundles in high speed objectives when operated at full aperture.

According to a further feature of the invention, the zonal departures of the meridional coma are held to very low values even for lateral bundles of high angular inclination to the system axis by attribution of appropriate powers to the air lenses between components II and III and between components III and IV. The air spaces between these pairs of components, identified in the drawing by the notations $s_{2,3}$ and $s_{3,4}$ possess such powers that the sum of the surface powers of the adjacent surfaces of components II and III lies between .55 and 1.5 times the equivalent power of the entire system, and likewise for the sum of the powers of the adjacent surfaces of components III and IV. Referring to these power sums as the powers of the air lenses between components II, III and between components III and IV and identifying them as $\phi_{s2,3}$ and $\phi_{s3,4}$ respectively, these relations may be algebraically written as follows:

$$0.55\Phi < \phi_{s2,3} < 1.10\Phi$$
$$0.55\Phi < \phi_{s3,4} < 1.10\Phi$$

In the foregoing relations and throughout the present application $\Phi$ indicates the equivalent total power of the objective. The symbol $\phi$ indicates a surface power or a surface power sum, according to the nature of the subscript applied to it. If the subscript identifies a single surface, $\phi$ with such subscript indicates the power of such surface. If the subscript indentifies a single lens element, the symbol $\phi$ with such subscript indicates the sum of the powers of the surfaces of such element. If the subscript identifies a component including more than one element, the symbol $\phi$ with such subscript indicates the sum of the powers of the exterior surfaces of such component. The power of a single surface is, as usual, given by the ratio of the difference in indices across the refracting surface to the radius of curvature thereof thus:

$$\phi_x = (n'_x - n_x)/R_x$$

in which $n'_x$ is the index of refraction of the medium preceding the interface identified by the subscript $x$, $n_x$ is the index of refraction of the medium following that interface, and $R_x$ is the radius of curvature of that interface.

For a lens element $y$ the power of the front surface is identified as $\phi_y$ whereas the power of the rear surface is identified as $\phi'_y$. The sum of the surface powers of the element $\phi_Y$ is accordingly $\phi_y + \phi'_y$. Correspondingly, the power of an air lens enclosed between two components $z$ and $z+1$ whose vertices are separated by a spacing $s_{z,z+1}$ is given as the sum of the powers of the surfaces limiting this air lens, thus:

$$\phi_{sz,z+1} = \phi'_z + \phi_{z+1}$$

In the accompanying drawings two embodiments of the lens of the invention are shown in axial section.

There will now be given data on three examples of lenses according to the invention. The lenses of these examples possess in accordance with the object and achievement of the invention a true anastigmatic field flattening, achieved without supplemental field flattening lenses and by the use of commercially available glass types.

For each example there is given the equivalent focal length $f$ of the system, the last intersection distance $p'_0$ on the image side of the system (for an infinitely distant object) and also the useful relative aperture, and the field angle $2\omega_0$ on the object side of the system.

The first lens to be considered, which will be referred to as Example 1, is of relative aperture 1:2.0 and of field angle $2\omega_0 = 60°$. It is characterized by a distribution of powers among the six components thereof as set forth in the accompanying Table 1, by a spacing A of component I from the diaphragm position amounting to 1.25 $f$, and by a spacing of components I and II amounting to 0.5 $f$.

TABLE 1

$\phi_I = -0.5\Phi$
$\phi_{II} = +0.5\Phi$
$\phi_{III} = +0.4\Phi$
$\phi_{IV} = -0.5\Phi$
$\phi_V = -0.1\Phi$
$\phi_V = +0.7\Phi$ The power distribution of Table 1 may be restated to the next higher order of accuracy in terms of the accompanying Table 2:

TABLE 2

$\phi_I = -0.52\Phi$
$\phi_{II} = +0.53\Phi$
$\phi_{III} = +0.44\Phi$
$\phi_{IV} = -0.52\Phi$
$\phi_V = -0.12\Phi$
$\phi_{VI} = +0.69\Phi$ In the lens of Example 1 the powers of the doublet components II, IV and V as given in Table 2 are obtained by means of powers for their individual elements as set forth in the accompanying Table 3:

TABLE 3

$\phi_{IIa} = +1.44\Phi$
$\phi_{IIb} = -0.91\Phi$
$\phi_{IVa} = -1.02\Phi$
$\phi_{IVb} = +0.50\Phi$
$\phi_{Va} = -2.02\Phi$
$\phi_{Vb} = +1.90\Phi$ The power distribution among components and elements set forth in Tables 2 and 3 for the lens of Example 1 is the product of a distribution of individual surface powers as follows:

TABLE 4

$\phi_1 = +0.30\Phi$
$\phi'_1 = -0.82\Phi$
$\phi_{2a} = +0.58\Phi$
$\phi'_{2a} = +0.86\Phi$
$\phi_{2b} = -0.71\Phi$
$\phi'_{2b} = -0.20\Phi$

TABLE 4—Continued $\phi_3 = +1.00\Phi$
$\phi'_3 = -0.56\Phi$
$\phi_{4a} = +1.41\Phi$
$\phi'_{4a} = -2.43\Phi$
$\phi_{4b} = +2.47\Phi$
$\phi'_{4b} = -1.97\Phi$
$\phi_{5a} = -1.01\Phi$
$\phi'_{5a} = -1.01\Phi$
$\phi_{5b} = +0.99\Phi$
$\phi'_{5b} = +0.91\Phi$
$\phi_6 = +0.22\Phi$
$\phi'_6 = +0.47\Phi$ With individual surface powers as set forth in Table 4, the lens of Example 1 possesses a spacing A from the front vertex of element $L_I$ to the diaphragm position amounting to $1.28\,f$ and a spacing $s_{1,2}$ between elements $L_I$ and $L_{IIa}$ of $0.48\,f$.

For the lens of Example 1 the following glasses may be used:

TABLE 5

| | | |
|---|---|---|
| $L_I$ | Light phosphate crown | $n = 1.50$ |
| $L_{IIa}$ | Special lanthanum crown | $n = 1.69$ |
| $L_{IIb}$ | Light barium flint | $n = 1.57$ |
| $L_{III}$ | Heavy lanthanum crown | $n = 1.71$ |
| $L_{IVa}$ | Normal flint | $n = 1.60$ |
| $L_{IVb}$ | Normal dense crown | $n = 1.61$ |
| $L_{Va}$ | Normal flint | $n = 1.60$ |
| $L_{Vb}$ | Dense barium crown | $n = 1.59$ |
| $L_{VI}$ | Heavy lanthanum crown | $n = 1.71$ |

The foregoing disposition of component, element, and individual surface powers leads with the glasses of Table 5 and with the introduction of appropriate element spacings to the following lens formulation for the lens of Example 1, in which linear dimensions are given in multiples of the equivalent focal length $f$ of the system.

TABLE 6

| Component | Element | Radii | Thickness $d$ and Spacing $s$ | Index of Refraction $n$ | Abbe Number $\nu$ |
|---|---|---|---|---|---|
| I | $L_I$ | $R_1 = +1.7f$ <br> $R'_1 = +0.6f$ | $d_1 = 0.14f$ <br> $s_{1,2} = 0.48f$ | $n_1 = 1.50$ | $\nu_1 = 67$ |
| II | $L_{IIa}$ | $R_{2a} = +1.2f$ <br> $R'_{2a} = -0.8f$ | $d_{2a} = 0.28f$ <br> $s_{2a,2b} = 0f$ | $n_{2a} = 1.69$ | $\nu_{2a} = 54$ |
| | $L_{IIb}$ | $R_{2b} = -0.8f$ <br> $R'_{2b} = +2.9f$ | $d_{2b} = 0.03f$ <br> $s_{2,3} = 0.01f$ | $n_{2b} = 1.57$ | $\nu_{2b} = 51$ |
| III | $L_{III}$ | $R_3 = +0.7f$ <br> $R'_3 = +1.3f$ | $d_3 = 0.07f$ <br> $s_{3,4} = 0.01f$ | $n_3 = 1.71$ | $\nu_3 = 54$ |
| IV | $L_{IVa}$ | $R_{4a} = +0.43f$ <br> $R'_{4a} = +0.25f$ | $d_{4a} = 0.03f$ <br> $s_{4a,4b} = 0f$ | $n_{4a} = 1.60$ | $\nu_{4a} = 38$ |
| | $L_{IVb}$ | $R_{4b} = +0.25f$ <br> $R'_{4b} = +0.31f$ | $d_{4b} = 0.10f$ <br> $s_{4,5} = 0.19f$ <br> $b_1 = 0.13f$ | $n_{4b} = 1.61$ | $\nu_{4b} = 59$ |
| V | $L_{Va}$ | $R_{5a} = -0.60f$ <br> $R'_{5a} = +0.60f$ | $d_{5a} = 0.04f$ <br> $s_{5a,5b} = 0f$ | $n_{5a} = 1.60$ | $\nu_{5a} = 38$ |
| | $L_{Vb}$ | $R_{5b} = +0.60f$ <br> $R'_{5b} = -0.65f$ | $d_{5b} = 0.12f$ <br> $s_{5,6} = 0.01f$ | $n_{5b} = 1.59$ | $\nu_{5b} = 61$ |
| VI | $L_{VI}$ | $R_6 = +2.3f$ <br> $R'_6 = -1.5f$ | $d_6 = 0.09f$ | $n_6 = 1.71$ | $\nu_6 = 34$ |

In the lens whose data are given in Table 6, the intersection distance $p'_0$ on the image side of the system is $0.82\,f$.

The data of Table 6, while it includes the third order Seidel corrections, can be further corrected to the following form for an objective of 100 mm. equivalent focal length, relative aperture $f/2.0$, useful field $2\omega_0 = 62°$, and image side intersection distance $p'_0 = 83.333$ mm.:

TABLE 7

| Component | Element | Radii, mm. | Thickness d and Spacing s, mm. | Index of Refraction n | Abbe Number ν |
|---|---|---|---|---|---|
| I | L_I | R_1 = +168.6263 | d_1 = 14.3006 | n_1 = 1.5038 | ν_1 = 66.7 |
|  |  | R'_1 = +61.5878 | s_{1,2} = 47.6686 |  |  |
|  | L_{IIa} | R_{2a} = +119.3879 | d_{2a} = 27.6764 | n_{2a} = 1.6935 | ν_{2a} = 53.5 |
| II |  | R'_{2a} = −80.0832 | s_{2a,2b} = 0 |  |  |
|  | L_{IIb} | R_{2b} = −80.0832 | d_{2b} = 3.8135 | n_{2b} = 1.5704 | ν_{2b} = 51.0 |
|  |  | R'_{2b} = +285.1391 | s_{2,3} = 0.4767 |  |  |
| III | L_{III} | R_3 = +71.3269 | d_3 = 6.6736 | n_3 = 1.7130 | ν_3 = 53.9 |
|  |  | R'_3 = +126.7288 | s_{3,4} = 0.4767 |  |  |
|  | L_{IVa} | R_{4a} = +42.6927 | d_{4a} = 3.3368 | n_{4a} = 1.6034 | ν_{4a} = 38.0 |
| IV |  | R'_{4a} = +24.7877 | s_{4a,4b} = 0 |  |  |
|  | L_{IVb} | R_{4b} = +24.7877 | d_{4b} = 10.0104 | n_{4b} = 1.6127 | ν_{4b} = 58.6 |
|  |  | R'_{4b} = +31.0322 | s_{4,5} = 18.7814; b_1 = 12.7814 |  |  |
|  | L_{Va} | R_{5a} = −59.7606 | d_{5a} = 3.8135 | n_{5a} = 1.6031 | ν_{5a} = 38.0 |
| V |  | R'_{5a} = +59.7606 | s_{5a,5b} = 0 |  |  |
|  | L_{Vb} | R_{5b} = +59.7606 | d_{5b} = 12.3938 | n_{5b} = 1.5891 | ν_{5b} = 61.2 |
|  |  | R'_{5b} = −64.6532 | s_{5,6} = 0.4767 |  |  |
| VI | L_{VI} | R_6 = +328.9132 | d_6 = 8.9617 | n_6 = 1.7130 | ν_6 = 53.9 |
|  |  | R'_6 = −149.8700 |  |  |  |

In this objective the negative meniscus in the front assembly, formed as a doublet, comprises two meniscus shaped elements of opposite power sign. Consequently the alternating succession of power signs is carried through not only for the system components but also for the individual lens elements throughout the front assembly.

In the lenses of the invention, whose make-up may be symbolically written: −M +D +M −D diaphragm −D +U, the doublets may be provided with the same radii on the adjacent surfaces of their two elements so that this interface may be made a cemented one. This construction may be applied to all three of the doublet components II, IV and V. While the adoption of this simplification involves sacrifice of the possibilities of correction which inhere in the use of different radii of curvature for such adjacent surfaces, nevertheless the objective of the invention even with this simplification represents a distinct improvement in the photographic art.

The applicant has found that for certain purposes it is advantageous to make the front component I or the rear component VI or both of two lens elements. Such a construction does not however depart from the essential properties of the lens of the invention.

Example 2

The second example of a lens system according to the invention for which data will be given is a lens of relative aperture 1:1.9 having a field angle of 63°, and an image side intersection distance of 82.9% f wherein f is the equivalent focal length of the system. With linear dimensions as multiples of f the data for this system is set forth in the accompanying Table 8.

TABLE 8

| Component | Element | Radii | Thickness d and Spacing s | Index of Refraction n | Abbe Number ν |
|---|---|---|---|---|---|
| I | L_I | R_1 = +1.6703f | d_1 = 0.14165f | n_1 = 1.5038 | ν_1 = 66.7 |
|  |  | R'_1 = +0.6100f | s_{1,2} = 0.47217f |  |  |
|  | L_{IIa} | R_{2a} = +1.1826f | d_{2a} = 0.27414f | n_{2a} = 1.6935 | ν_{2a} = 53.5 |
| II |  | R'_{2a} = −0.7885f | s_{2a,2b} = 0 (cemented) |  |  |
|  | L_{IIb} | R_{2b} = −0.7885f | d_{2b} = 0.03777f | n_{2b} = 1.5704 | ν_{2b} = 51.0 |
|  |  | R'_{2b} = +2.8244f | s_{2,3} = 0.00472f |  |  |
| III | L_{III} | R_3 = +0.7065f | d_3 = 0.06610f | n_3 = 1.7130 | ν_3 = 53.9 |
|  |  | R'_3 = +1.2553f | s_{3,4} = 0.00472f |  |  |
|  | L_{IVa} | R_{4a} = +0.4229f | d_{4a} = 0.03305f | n_{4a} = 1.6034 | ν_{4a} = 38.0 |
| IV |  | R'_{4a} = +0.2455f | s_{4a,4b} = 0 (cemented) |  |  |
|  | L_{IVb} | R_{4b} = +0.2455f | d_{4b} = 0.10057f | n_{4b} = 1.6127 | ν_{4b} = 58.6 |
|  |  | R'_{4b} = +0.3074f | s_{4,5} = 0.18604f; b_1 = 0.13604f |  |  |
|  | L_{Va} | R_{5a} = −0.5919f | d_{5a} = 0.03777f | n_{5a} = 1.6031 | ν_{5a} = 38.0 |
| V |  | R'_{5a} = +0.5919f | s_{5a,5b} = 0 (cemented) |  |  |
|  | L_{Vb} | R_{5b} = +0.5919f | d_{5b} = 0.12276f | n_{5b} = 1.5891 | ν_{5b} = 61.2 |
|  |  | R'_{5b} = −0.6404f | s_{5,6} = 0.00472f |  |  |
| VI | L_{VI} | R_6 = +3.2580f | d_6 = 0.08877f | n_6 = 1.7130 | ν_6 = 53.9 |
|  |  | R'_6 = −1.5289f |  |  |  |

The individual surface powers and the element and component power sums of the lens of Example 2 are set forth in the following Table 9 as multiples of the equivalent power $\Phi$ of the entire system:

TABLE 9

| | | |
|---|---|---|
| $\phi_1 = +0.3016\Phi$ | | |
| $\phi'_1 = -0.8258\Phi$ | | $\phi_I = -0.5242\Phi$ |
| $\phi_{2a} = +0.5864\Phi$ | | |
| $\phi'_{2a} = +0.8795\Phi$ | $\phi_{(2a)} = +1.4659\Phi$ | |
| $\phi_{2b} = -0.7234\Phi$ | | $\phi_{II} = +0.5406\Phi$ |
| $\phi'_{2b} = -0.2019\Phi$ | $\phi_{(2b)} = -0.9253\Phi$ | |
| $\phi_3 = +1.0092\Phi$ | | |
| $\phi'_3 = -0.5680\Phi$ | | $\phi_{III} = +0.4412\Phi$ |
| $\phi_{4a} = +1.4269\Phi$ | | |
| $\phi'_{4a} = -2.4575\Phi$ | $\phi_{(4a)} = -1.0306\Phi$ | |
| $\phi_{4b} = +2.4954\Phi$ | | $\phi_{IV} = -0.5285\Phi$ |
| $\phi'_{4b} = -1.9933\Phi$ | $\phi_{(4b)} = +0.5021\Phi$ | |
| $\phi_{5a} = -1.0188\Phi$ | | |
| $\phi'_{5a} = -1.0188\Phi$ | $\phi_{(5a)} = -2.0376\Phi$ | |
| $\phi_{5b} = +0.9952\Phi$ | | $\phi_V = -0.1226\Phi$ |
| $\phi'_{5b} = +0.9198\Phi$ | $\phi_{(5b)} = +1.9150\Phi$ | |
| $\phi_6 = +0.2188\Phi$ | | |
| $\phi'_6 = +0.4664\Phi$ | | $\phi_{VI} = +0.6852\Phi$ |

The powers $\phi_{s2.3}$ and $\phi_{s3.4}$ of the air lenses between components II and III and between components III and IV respectively are in the system of Example 2

$$+0.8073\Phi \text{ and } +0.8589\Phi$$

Example 3

In the Example 3 now to be gievn the power of the divergent meniscus front component I is, in contrast to the Examples 1 and 2, larger than the power of the doublet II. In addition the elements of the rear assembly behind the diaphragm possess somewhat larger powers, and the image side intersection distance has been increased to over 88% of the equivalent focal length in order to facilitate use of the lens in reflex type cameras.

In the construction of this Example 3, glasses of extremely high index have been avoided, without however any loss in performance. On the contrary the glasses of the examples already given have been retained without change. The relative aperture of this lens of Example 3 is 1:2 and the useful image field amounts to 62 degrees.

The power sums of the components and elements are given in the following Table 10, as multiples of the equivalent power $\Phi$ of the system:

TABLE 10

| | |
|---|---|
| $\phi_I = -0.58\Phi$ | |
| $\phi_{II} = +0.55\Phi$ | $\phi_{2a} = +1.48\Phi$ |
| $\phi_{III} = +0.43\Phi$ | $\phi_{2b} = -0.93\Phi$ |
| $\phi_{IV} = -0.53\Phi$ | $\phi_{4a} = -1.04\Phi$ |
| | $\phi_{4b} = +0.51\Phi$ |
| | $\phi_{5a} = -2.08\Phi$ |
| $\phi_V = -0.15\Phi$ | |
| $\phi_{VI} = +0.70\Phi$ | $\phi_{5b} = +1.93\Phi$ |

This set of power sums is achieved by provision of individual surface powers as set out in the following Table 11.

TABLE 11

$\phi_1 = +0.26\Phi$
$\phi'_1 = -0.84\Phi$ $\phi_{2a} = +0.60\Phi$
$\phi'_{2a} = +0.88\Phi$ $\phi_{2b} = -0.72\Phi$
$\phi'_{2b} = -0.21\Phi$ $\phi_3 = +1.03\Phi$
$\phi'_3 = -0.60\Phi$ $\phi_{4a} = +1.46\Phi$
$\phi'_{4a} = -2.50\Phi$ $\phi_{4b} = +2.54\Phi$
$\phi'_{4b} = -2.03\Phi$ $\phi_{5a} = -1.04\Phi$
$\phi'_{5a} = -1.04\Phi$ $\phi_{5b} = +1.02\Phi$
$\phi'_{5b} = +0.91\Phi$ $\phi_6 = +0.23\Phi$
$\phi'_6 = +0.47\Phi$ The system of Example 3, with the power distribution given in Tables 10 and 11, is obtained with a set of radii, thicknesses and spacings, and for glasses of indices as set forth in the following Table 12, wherein linear dimensions are given in multiples of the equivalent focal length $f$:

TABLE 12

| Component | Element | Radii | Thickness $d$ and Spacing $s$ | Index of Refraction $n$ |
|---|---|---|---|---|
| I | $L_I$ | $R_1 = +1.96f$ $R'_1 = +0.60f$ | $d_1 = 0.11f$ $s_{1,2} = 0.46f$ | $n_1 = 1.50$ |
| II | $L_{IIa}$ | $R_{2a} = +1.15f$ $R'_{2a} = -0.79f$ | $d_{2a} = 0.27f$ $s_{2a,2b} = 0$ | $n_{2a} = 1.69$ |
| | $L_{IIb}$ | $R_{2b} = -0.79f$ $R'_{2b} = +2.77f$ | $d_{2b} = 0.04f$ $s_{2,3} = 0.005f$ | $n_{2b} = 1.57$ |
| III | $L_{III}$ | $R_3 = +0.69f$ $R'_3 = +1.18f$ | $d_3 = 0.06f$ $s_{3,4} = 0.005f$ | $n_3 = 1.71$ |
| IV | $L_{IVa}$ | $R_{4a} = +0.41f$ $R'_{4a} = +0.24f$ | $d_{4a} = 0.03f$ $s_{4a,4b} = 0$ | $n_{4a} = 1.60$ |
| | $L_{IVb}$ | $R_{4b} = +0.24f$ $R'_{4b} = +0.30f$ | $d_{4b} = 0.10f$ $s_{4,5} = 0.18f$ $b_1 = 0.14f$ | $n_{4b} = 1.61$ |
| V | $L_{Va}$ | $R_{5a} = -0.58f$ $R'_{5a} = +0.58f$ | $d_{5a} = 0.04f$ $s_{5a,5b} = 0$ | $n_{5a} = 1.60$ |
| | $L_{Vb}$ | $R_{5b} = +0.58f$ $R'_{5b} = -0.65f$ | $d_{5b} = 0.12f$ $s_{5,6} = 0.005f$ | $n_{5b} = 1.59$ |
| VI | $L_{VI}$ | $R_6 = +3.1f$ $R'_6 = -1.5f$ | $d_6 = 0.07f$ | $n_6 = 1.71$ |

The data of Table 12 incorporate corrections for the third order Seidel region. Upon the introduction of fine corrections, and with an assumed equivalent focal length $f$ of 100 mm., the data for the lens of Example 3 take on the form of the following Table 13, the system of which has an image side intersection distance $p'_0$ of 88.56743 mm. and a spacing of 123.3 mm. between the front vortex of the first element and the diaphragm position.

TABLE 13

| Component | Element | Radii, mm. | Thickness $d$ and Spacing $s$, mm. | Index of Refraction $n$, mm. | Abbe Number $\nu$ |
|---|---|---|---|---|---|
| I | $L_I$ | $R_1 = +196.4292$ | $d_1 = 11.12388$ | $n_1 = 1.5038$ | $\nu_1 = 66.7$ |
| | | $R'_1 = +60.18577$ | $s_{1,2} = 46.34951$ | | |
| | $L_{IIa}$ | $R_{2a} = +114.6483$ | $d_{2a} = 26.91053$ | $n_{2a} = 1.6935$ | $\nu_{2a} = 53.5$ |
| II | | $R'_{2a} = -78.71816$ | $s_{2a,2b} = 0$ | | |
| | $L_{IIb}$ | $R_{2b} = -78.71816$ | $d_{2b} = 3.707961$ | $n_{2b} = 1.5704$ | $\nu_{2b} = 51.0$ |
| | | $R'_{2b} = +277.2489$ | $s_{2,3} = 0.463495$ | | |
| III | $L_{III}$ | $R_3 = +69.35278$ | $d_3 = 6.488932$ | $n_3 = 1.7130$ | $\nu_3 = 53.9$ |
| | | $R'_3 = +118.4962$ | $s_{3,4} = 0.463495$ | | |
| | $L_{IVa}$ | $R_{4a} = +41.32615$ | $d_{4a} = 3.244466$ | $n_{4a} = 1.6034$ | $\nu_{4a} = 38.0$ |
| IV | | $R'_{4a} = +24.10175$ | $s_{4a,4b} = 0$ | | |
| | $L_{IVb}$ | $R_{4b} = +24.10175$ | $d_{4b} = 10.15054$ | $n_{4b} = 1.6127$ | $\nu_{4b} = 58.4$ |
| | | $R'_{4b} = +30.17353$ | $s_{4,5} = 18.26171$ | | |
| | $L_{Va}$ | $R_{5a} = -58.10653$ | $d_{5a} = 3.707961$ | $n_{5a} = 1.6031$ | $\nu_{5a} = 38.0$ |
| V | | $R'_{5a} = +58.10653$ | $s_{5a,5b} = 0$ | | |
| | $L_{Vb}$ | $R_{5b} = +58.10653$ | $d_{5b} = 12.05087$ | $n_{5b} = 1.5891$ | $\nu_{5b} = 61.2$ |
| | | $R'_{5b} = -64.61678$ | $s_{5,6} = 0.463495$ | | |
| VI | $L_{VI}$ | $R_6 = +314.3887$ | $d_6 = 6.859728$ | $n_6 = 1.7130$ | $\nu_6 = 53.9$ |
| | | $R'_6 = -150.0797$ | | | |

The surface powers and the surface power sums by elements and components of the system of Example 3 as set up in Table 13 are for $f = 100$ mm. and $\Phi = 10$ dptr. as follows:

TABLE 14

| | |
|---|---|
| $\phi_1 = +2.564\ 792$ dptr. | |
| $\phi'_1 = -8.370\ 749$ dptr. | $\phi_I = -5.805\ 957$ dptr. |
| $\phi_{2a} = +6.048\ 934$ dptr. | |
| $\phi'_{2a} = +8.809\ 911$ dptr. | $\phi_{2a} = +14.858\ 845$ dptr. |
| | $\phi_{II} = +5.555\ 384$ dptr. |
| $\phi_{2b} = -7.246\ 104$ dptr. | |
| $\phi'_{2b} = -2.057\ 357$ dptr. | $\phi_{2b} = -9.303\ 461$ dptr. |
| $\phi_3 = +10.280\ 771$ dptr. | |
| $\phi'_3 = -6.017\ 069$ dptr. | $\phi_{III} = +4.263\ 702$ dptr. |
| $\phi_{4a} = +14.600\ 924$ dptr. | |
| $\phi'_{4a} = -25.035\ 531$ dptr. | $\phi_{4a} = -10.434\ 607$ dptr. |
| $\phi_{4b} = +25.421\ 395$ dptr. | $\phi_{IV} = -5.319\ 087$ dptr. |
| $\phi'_{4b} = -20.305\ 875$ dptr. | $\phi_{4b} = +5.115\ 520$ dptr. |
| $\phi_{5a} = -10.379\ 212$ dptr. | |
| $\phi'_{5a} = -10.379\ 212$ dptr. | $\phi_{5a} = -20.758\ 424$ dptr. |
| $\phi_{5b} = +10.138\ 275$ dptr. | $\phi_V = -1.503\ 322$ dptr. |
| $\phi'_{5b} = +9.116\ 827$ dptr. | $\phi_{5b} = +19.255\ 102$ dptr. |
| $\phi_6 = +2.267\ 893$ dptr. | |
| $\phi'_6 = +4.750\ 808$ dptr. | $\phi_{VI} = +7.018\ 701$ dptr. |
| $\phi_{S_{2,3}} = +8.223\ 414$ dptr. | |
| $\phi_{S_{3,4}} = +8.583\ 855$ dptr. | |

I claim:

1. A high speed objective lens system comprising, from front to back and in front of the diaphragm position, a first component of negative power having surfaces of unequal curvature and having its rear surface concave toward the rear, a second component of positive doublet form having exterior surfaces of unequal curvature and having two elements of opposite power, a third component of positive meniscus form having its rear surface concave toward the rear, and a fourth component of negative doublet form, and, behind the diaphragm position, a rear assembly of Gaussian type including at least two elements, said first component being spaced from the diaphragm position by from 0.8 to 1.8 times the equivalent focal length of the system, the air spaces between said second and third components and between said third and fourth components having the shape of negative lenses with the rear surfaces thereof concave toward the rear, said air lenses functioning convergently, the powers $\phi_I$ to $\phi_{IV}$ respectively of the said first through fourth components being related to the equivalent total power $\Phi$ of the system as follows:

$$0.35\Phi < -\phi_I < 0.75\Phi$$
$$0.35\Phi < \phi_{II} < 0.75\Phi$$
$$0.30\Phi < \phi_{III} < 0.60\Phi$$
$$0.35\Phi < -\phi_{IV} < 0.75\Phi$$

and the first component being spaced from the second component by a distance of from one third to two thirds of the equivalent focal length of the system.

2. An objective lens system according to claim 1 in which the rear assembly includes from front to back fifth and sixth components having respectively powers $\phi_V$ and $\phi_{VI}$ related to the equivalent power $\Phi$ of the system as follows:

$$0.025\Phi < -\phi_V < 0.625\Phi$$
$$0.4\Phi < \phi_{VI} < 1.2\Phi$$

3. An objective lens system according to claim 2 in which the sum $\phi_{S_{2,3}}$ of the powers of the rear surface of said second component and of the front surface of said third component and the sum $\phi_{S_{3,4}}$ of the powers of the rear surface of said third component and of the front surface of said fourth component lie between 0.55 and 1.10 times the total equivalent power of the system.

4. An objective system according to claim 2 in which the sums $\phi_I$ to $\phi_{VI}$ of the powers of the surfaces of said six components are related to the equivalent power $\Phi$ of the system substantially as follows:

$$\phi_I = -0.5\Phi$$
$$\phi_{II} = +0.5\Phi$$
$$\phi_{III} = +0.4\Phi$$
$$\phi_{IV} = -0.5\Phi$$
$$\phi_V = -0.1\Phi$$
$$\phi_{VI} = +0.7\Phi$$

5. An objective system according to claim 2 in which the sums $\phi_I$ to $\phi_{VI}$ of the powers of the surfaces of said six components are related to the equivalent power $\Phi$ of the system substantially as follows:

$$\phi_I = -0.52\Phi$$
$$\phi_{II} = +0.53\Phi$$
$$\phi_{III} = +0.44\Phi$$
$$\phi_{IV} = -0.52\Phi$$
$$\phi_V = -0.12\Phi$$
$$\phi_{VI} = +0.69\Phi$$

in which the fifth component is of doublet form, and in which the sums $\phi_{IIa}$, $\phi_{IIb}$, $\phi_{IVa}$, $\phi_{IVb}$, $\phi_{Va}$ and $\phi_{Vb}$ of the powers of the front and rear elements of the second, fourth and fifth components are related to the equivalent total power $\Phi$ of the system substantially as follows:

$$\phi_{IIa} = +1.44\Phi$$
$$\phi_{IIb} = -0.91\Phi$$
$$\phi_{IVa} = -1.02\Phi$$
$$\phi_{IVb} = +0.50\Phi$$
$$\phi_{Va} = 2.02\Phi$$
$$\phi_{Vb} = +1.90\Phi$$

6. An objective lens system according to claim 5 in which the powers $\phi_1$ to $\phi'_6$ of the individual surfaces of the elements are related to the equivalent total power $\Phi$ of the system substantially as follows:

$$\phi_1 = +0.30\Phi$$
$$\phi'_1 = -0.82\Phi$$
$$\phi_{2a} = +0.58\Phi$$
$$\phi'_{2a} = +0.86\Phi$$
$$\phi_{2b} = -0.71\Phi$$
$$\phi'_{2b} = -0.20\Phi$$
$$\phi_3 = +1.00\Phi$$
$$\phi'_3 = -0.56\Phi$$
$$\phi_{4a} = +1.41\Phi$$
$$\phi'_{4a} = -2.43\Phi$$
$$\phi_{4b} = +2.47\Phi$$
$$\phi'_{4b} = -1.97\Phi$$
$$\phi_{5a} = -1.01\Phi$$
$$\phi'_{5a} = -1.01\Phi$$
$$\phi_{5b} = +0.99\Phi$$
$$\phi'_{5b} = +0.91\Phi$$
$$\phi_6 = +0.22\Phi$$
$$\phi'_6 = +0.47\Phi$$

and in which the front vertex of the first component is spaced from the diaphragm position by substantially 1.28 times the equivalent focal length $f$ of the system and in which the first and second components are spaced by substantially $0.48f$.

7. An objective lens system comprising, from front to back nine elements $L_I$, $L_{IIa}$, $L_{IIb}$, $L_{III}$, $L_{IVa}$, $L_{IVb}$, $L_{Va}$, $L_{Vb}$ and $L_{VI}$, said system having an equivalent focal length $f$ and conforming substantially to the following conditions:

| Element | Radii | Thickness $d$ and Spacing $s$ | Index of Refraction $n$ | Abbe Number $\nu$ |
|---|---|---|---|---|
| $L_I$ | $R_1 = +1.7f$ | $d_1 = 0.14f$ | $n_1 = 1.50$ | $\nu_1 = 67$ |
|  | $R'_1 = +0.6f$ | $s_{1,2} = 0.48f$ |  |  |
| $L_{IIa}$ | $R_{2a} = +1.2f$ | $d_{2a} = 0.28f$ | $n_{2a} = 1.69$ | $\nu_{2a} = 54$ |
|  | $R'_{2a} = -0.8f$ | $s_{2a,2b} = 0f$ |  |  |
| $L_{IIb}$ | $R_{2b} = -0.8f$ | $d_{2b} = 0.03f$ | $n_{2b} = 1.57$ | $\nu_{2b} = 51$ |
|  | $R'_{2b} = +2.9f$ | $s_{2,3} = 0.01f$ |  |  |
| $L_{III}$ | $R_3 = +0.7f$ | $d_3 = 0.07f$ | $n_3 = 1.71$ | $\nu_3 = 54$ |
|  | $R'_3 = +1.3f$ | $s_{3,4} = 0.01f$ |  |  |
| $L_{IVa}$ | $R_{4a} = +0.43f$ | $d_{4a} = 0.03f$ | $n_{4a} = 1.60$ | $\nu_{4a} = 38$ |
|  | $R'_{4a} = +0.25f$ | $s_{4a,4b} = 0f$ |  |  |
| $L_{IVb}$ | $R_{4b} = +0.25f$ | $d_{4b} = 0.10f$ | $n_{4b} = 1.61$ | $\nu_{4b} = 59$ |
|  | $R'_{4b} = +0.31f$ | $s_{4,5} = 0.19f$, $b_1 = 0.13f$ |  |  |
| $L_{Va}$ | $R_{5a} = -0.60f$ | $d_{5a} = 0.04f$ | $n_{5a} = 1.60$ | $\nu_{5a} = 38$ |
|  | $R'_{5a} = +0.60f$ | $s_{5a,5b} = 0f$ |  |  |
| $L_{Vb}$ | $R_{5b} = +0.60f$ | $d_{5b} = 0.12f$ | $n_{5b} = 1.59$ | $\nu_{5b} = 61$ |
|  | $R'_{5b} = -0.65f$ | $s_{5,6} = 0.01f$ |  |  |
| $L_{VI}$ | $R_6 = +3.3f$ | $d_6 = 0.09f$ | $n_6 = 1.71$ | $\nu_6 = 34$ |
|  | $R'_6 = -1.5f$ |  |  |  |

8. An objective lens system comprising, from front to back, nine elements $L_I$, $L_{IIa}$, $L_{IIb}$, $L_{III}$, $L_{IVa}$, $L_{IVb}$, $L_{Va}$, $L_{Vb}$, and $L_{VI}$, said system having an equivalent focal length 100 mm. and conforming substantially to the following conditions:

| Element | Radii, mm. | Thickness $d$ and Spacing $s$, mm. | Index of Refraction $n$ | Abbe Number $\nu$ |
|---|---|---|---|---|
| $L_I$ | $R_1 = +168.6263$ | $d_1 = 14.3006$ | $n_1 = 1.5038$ | $\nu_1 = 66.7$ |
|  | $R'_1 = +61.5878$ | $s_{1,2} = 47.6686$ |  |  |
| $L_{IIa}$ | $R_{2a} = +119.3879$ | $d_{2a} = 27.6764$ | $n_{2a} = 1.6935$ | $\nu_{2a} = 53.5$ |
|  | $R'_{2a} = -80.0832$ | $s_{2a,2b} = 0$ |  |  |
| $L_{IIb}$ | $R_{2b} = -80.0832$ | $d_{2b} = 3.8135$ | $n_{2b} = 1.5704$ | $\nu_{2b} = 51.0$ |
|  | $R'_{2b} = +285.1391$ | $s_{2,3} = 0.4767$ |  |  |
| $L_{III}$ | $R_3 = +71.3269$ | $d_3 = 6.6736$ | $n_3 = 1.7130$ | $\nu_3 = 53.9$ |
|  | $R'_3 = +126.7288$ | $s_{3,4} = 0.4767$ |  |  |
| $L_{IVa}$ | $R_{4a} = +42.6927$ | $d_{4a} = 3.3368$ | $n_{4a} = 1.6034$ | $\nu_{4a} = 38.0$ |
|  | $R'_{4a} = +24.7877$ | $s_{4a,4b} = 0$ |  |  |
| $L_{IVb}$ | $R_{4b} = +24.7877$ | $d_{4b} = 10.0104$ | $n_{4b} = 1.6127$ | $\nu_{4b} = 58.6$ |
|  | $R'_{4b} = +31.0322$ | $s_{4,5} = 18.7814$, $b_1 = 12.7814$ |  |  |
| $L_{Va}$ | $R_{5a} = -59.7606$ | $d_{5a} = 3.8135$ | $n_{5a} = 1.6031$ | $\nu_{5a} = 38.0$ |
|  | $R'_{5a} = +59.7606$ | $s_{5a,5b} = 0$ |  |  |
| $L_{Vb}$ | $R_{5b} = +59.7606$ | $d_{5b} = 12.3938$ | $n_{5b} = 1.5891$ | $\nu_{5b} = 61.2$ |
|  | $R'_{5b} = -64.6532$ | $s_{5,6} = 0.4767$ |  |  |
| $L_{VI}$ | $R_6 = +328.9132$ | $d_6 = 8.9617$ | $n_6 = 1.7130$ | $\nu_6 = 53.9$ |
|  | $R'_6 = -149.8700$ |  |  |  |

9. An objective lens system comprising, from front to back nine elements $L_I$, $L_{IIa}$, $L_{IIb}$, $L_{III}$, $L_{IVa}$, $L_{IVb}$, $L_{Va}$, $L_{Vb}$ and $L_{VI}$, said system having an equivalent focal length $f$ and conforming substantially to the following conditions:

| Element | Radii | Thickness $d$ and Spacing $s$ | Index of Refraction $n$ | Abbe Number $\nu$ |
|---|---|---|---|---|
| $L_I$ | $R_1 = +1.6703f$ <br> $R'_1 = +0.6100f$ | $d_1 = 0.14165f$ <br> $s_{1,2} = 0.47217f$ | $n_1 = 1.5038$ | $\nu_1 = 66.7$ |
| $L_{IIa}$ | $R_{2a} = +1.1826f$ <br> $R'_{2a} = -0.7885f$ | $d_{2a} = 0.27414f$ <br> $s_{2a,2b} = 0$ (cemented) | $n_{2a} = 1.6935$ | $\nu_{2a} = 53.5$ |
| $L_{IIb}$ | $R_{2b} = -0.7885f$ <br> $R'_{2b} = +2.8244f$ | $d_{2b} = 0.03777f$ <br> $s_{2,3} = 0.00472f$ | $n_{2b} = 1.5704$ | $\nu_{2b} = 51.0$ |
| $L_{III}$ | $R_3 = +0.7065f$ <br> $R'_3 = +1.2553f$ | $d_3 = 0.06610f$ <br> $s_{3,4} = 0.00472f$ | $n_3 = 1.7130$ | $\nu_3 = 53.9$ |
| $L_{IVa}$ | $R_{4a} = +0.4229f$ <br> $R'_{4a} = +0.2455f$ | $d_{4a} = 0.03305f$ <br> $s_{4a,4b} = 0$ (cemented) | $n_{4a} = 1.6034$ | $\nu_{4a} = 38.0$ |
| $L_{IVb}$ | $R_{4b} = +0.2455f$ <br> $R'_{4b} = +0.3074f$ | $d_{4b} = 0.10057f$ <br> $s_{4,5} = 0.19604f$ <br> $b_1 = 0.13604f$ | $n_{4b} = 1.6127$ | $\nu_{4b} = 58.6$ |
| $L_{Va}$ | $R_{5a} = -0.5919f$ <br> $R'_{5a} = +0.5919f$ | $d_{5a} = 0.03777f$ <br> $s_{5a,5b} = 0$ (cemented) | $n_{5a} = 1.6031$ | $\nu_{5a} = 38.0$ |
| $L_{Vb}$ | $R_{5b} = +0.5919f$ <br> $R'_{5b} = -0.6404f$ | $d_{5b} = 0.12276f$ <br> $s_{5,6} = 0.00472f$ | $n_{5b} = 1.5891$ | $\nu_{5b} = 61.2$ |
| $L_{VI}$ | $R_6 = +3.2580f$ <br> $R'_6 = -1.5289f$ | $d_6 = 0.08877f$ | $n_6 = 1.7130$ | $\nu_6 = 53.9$ |

References Cited in the file of this patent

UNITED STATES PATENTS

| | | |
|---|---|---|
| 2,662,447 | Tronnier | Dec. 15, 1953 |
| 2,780,139 | Lange | Feb. 5, 1957 |
| 2,796,002 | Klemt | June 18, 1957 |
| 2,824,494 | Klemt | Feb. 25, 1958 |
| 2,844,997 | Lange | July 29, 1958 |